(12) United States Patent
Gibbs et al.

(10) Patent No.: US 6,683,877 B1
(45) Date of Patent: Jan. 27, 2004

(54) CARRYING VOICE TRAFFIC OVER BROAD BAND NETWORKS

(75) Inventors: Graeme Gibbs, Saffron Walden (GB); Rade Gvodanovic, Harlow (GB)

(73) Assignee: Noetel Networks Limited, St. Laurent (CA)

( * ) Notice: Subject to any disclaimer, the term of this patent is extended or adjusted under 35 U.S.C. 154(b) by 0 days.

(21) Appl. No.: 09/469,141

(22) Filed: Dec. 21, 1999

Related U.S. Application Data

(60) Provisional application No. 60/120,174, filed on Feb. 16, 1999.

(51) Int. Cl.$^7$ .......................... H04L 12/28; H04L 12/56
(52) U.S. Cl. ............................. 370/395.2; 370/395.3; 370/400
(58) Field of Search ........................... 370/395.1, 395.2, 370/395.3, 396–399, 400, 401, 410

(56) References Cited

U.S. PATENT DOCUMENTS

| | | | | |
|---|---|---|---|---|
| 6,078,586 A | * | 6/2000 | Dugan et al. | 370/395.2 |
| 6,272,127 B1 | * | 8/2001 | Golden et al. | 370/352 |
| 6,275,493 B1 | * | 8/2001 | Morris et al. | 370/395.4 |
| 6,366,580 B1 | * | 4/2002 | Bradley et al. | 370/395.2 |

* cited by examiner

Primary Examiner—Wellington Chin
Assistant Examiner—Raj Jain
(74) Attorney, Agent, or Firm—Barnes & Thornburg

(57) ABSTRACT

Voice traffic is transported between first and second media gateways over a virtual channel connection incorporated in a virtual trunk group in a packet or cell based network The virtual channel connection (VCC) is agreed between the gateways via a mutual exchange of session descriptors. Typically, the VCC is selected or created by a terminating gateway, and this information is relayed in a returned session descriptor to an originating gateway so that the connection can then be established. The session descriptor may also be used to carry information whereby the gateways can negotiate an adaptation layer and/or a connection fabric to be used.

14 Claims, 1 Drawing Sheet

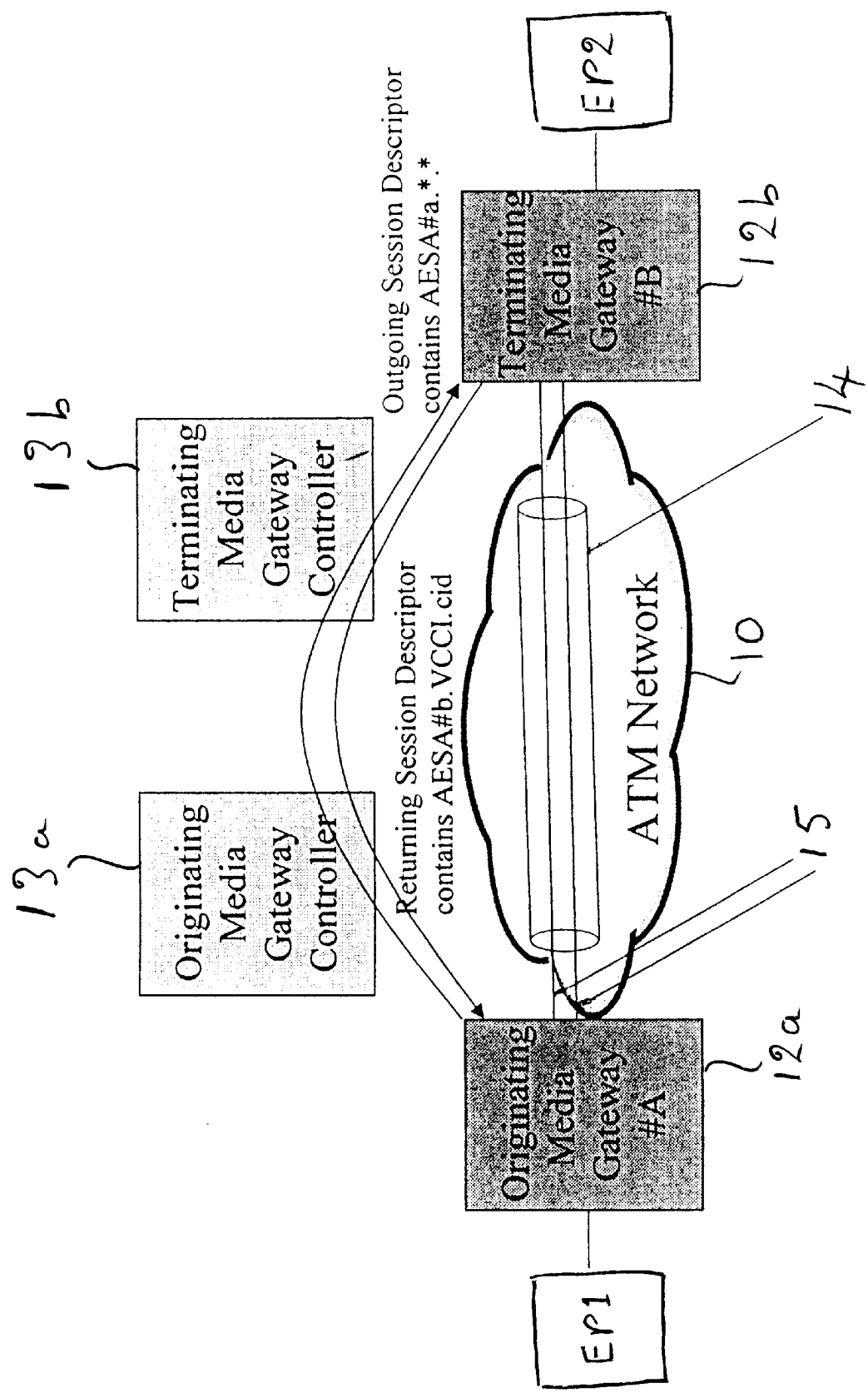

CARRYING VOICE TRAFFIC OVER BROAD BAND NETWORKS

This application is the non-provisional filing of provisional U.S. patent application Serial No. 60/120,174, filed Feb. 16, 1999.

FIELD OF THE INVENTION

This invention relates to arrangements and methods for transporting narrow band, e.g. voice traffic over a broad band packet network.

BACKGROUND OF THE INVENTION

Much interest has been shown recently in migrating the voice networks of enterprises and carriers from connection oriented TDM networks which have traditionally been used to carry voice traffic to broad band packet networks currently used to transport data traffic. The rationale for this is based on the current rapid rate of growth of data within most networks, to the point that data has overtaken voice in capacity carried. Thus there is now a desire to reduce costs by consolidating voice networks and data overlays to a more homogenous network where voice may be carried effectively as another type of data. This, coupled with the increasing maturity and capacity of the necessary data components (e.g. routers, ATM switches), means that Voice-over-IP and the Voice-over-ATM architectures are being studied by many industry fora. The two main protagonist technologies for the future universal data network are IP (Internet protocol) and ATM (asynchronous transfer mode), each with their own advantages and disadvantages.

At the same time, there is a desire that, in these new architectures, the two main roles of the traditional voice switch, i.e. control and media switching, are separated. This is desirable for many reasons, e.g.

to force open architectures and open protocols on the industry so as to drive up competition and to drive down prices, to allow the control platform to ride the power curve for computing performance, to allow an open platform for software vendors to be able to offer new services.

A typical voice-over-packet network may consist of a number of media gateways (MG) at the periphery of a packet network (IP or ATM). The function of each gateway is to provide an interface between the packet medium and another medium, e.g. analog loop, digital trunk, or another packet medium. This inter-conversion may e.g. analog loop, digital trunk, or another packet medium. This inter-conversion may include voice code conversion, packetisation, echo cancellation, silence suppression, tone detection and tone generation. These gateways are relatively simple and are controlled each by a media gateway controller (MGC). This MGC handles narrow-band call control, signalling, call routing, billing etc, and one MGC may control a large number of such gateways. However to allow such system to be scaled, the architectures allow for many such media gateway controllers within a network. These gateway controllers communicate with each other to allow a call from one MG controlled by a MGC to be terminated on another MG controlled by another MGC. Ideally the function of the mediate gateway controller should be independent of the technology of the packet fabric, but this has been found difficult to achieve.

In many recently announced VoIP (voice-over-IP) architectures, where the media gateway controller function has been separated from the media gateway function, the two gateways at either end of an IP network need to exchange their transport addresses so that they may then send voice packets to each other over an IP network. These architectures as typified by that described in the IETF drafts SGCP and MGCP, typically have the following signalling flow:

a) The originating media gateway controller sends the originating gateway a CreateConnection command with the first external endpoint (EP1) defined but no network endpoint.

b) The originating gateway selects a UDP port which it wishes to use for this call and responds with its IP address and this UDP port.

c) The originating media gateway controller passes this information to the terminating media gateway controller (which may in fact be to itself for a local call)

d) The terminating media gateway controller sends a CreateConnection command to the terminating gateway with the second external endpoint defined (EP2) and includes the originating gateway's IP address and UDP port.

e) The terminating gateway selects a UDP port which it wishes to use for this call, makes the local connection and responds with its IP address and UDP port.

f) This information is relayed by the terminating media gateway controller to the originating media gateway controller.

g) The originating media gateway controller sends the originating gateway a ModifyConection command which includes the terminating gateway's IP address and UDP port.

h) The originating gateway makes the local connection and the end to end connections is complete.

A typical Voice-over-ATM network consists of a set of such gateways intermeshed by ATM virtual circuits (VCCs). These VCCs carry the voice calls across the ATM network. This is similar to a tandem TDM network using a set of intermeshing trunk groups. These VCCs could be permanent virtual circuits (PVCs). However, careful planning is required to prevent the link between any two sites saturating and causing blocking of calls. An alternative approach that has been proposed is to allow the setting up of switched virtual circuits (SVCs) on demand between any two gateways. However, there is at present no simple mechanism for allowing the narrow-band call to trigger such a SVC, for defining between which points such an SVC should be established, and for binding the narrow-band call to the SVC in question.

SUMMARY OF THE INVENTION

An object of the invention is to minimise or to overcome the above disadvantages.

A further object of the invention is to provide an improved arrangement and method for carrying voice traffic over a broadband, e.g. a packet or cell based network.

According to a first aspect of the invention, there is provided a method of setting up a voice connection in a multimedia session between first and second gateways over a broadband network, the method comprising exchanging session descriptors between said gateways, and providing in said session descriptors information whereby said first and second gateways negotiate and agree on the adoption of one or more attributes for said voice connection According to another aspect of the invention there is provided a method of transporting voice traffic over a virtual channel in a broadband network, the method comprising using a virtual channel connection indicator (VCCI) within a session descriptor to identify a virtual channel connection for that voice traffic within a bundle of virtual channel connections in an ATM trunk group on which the voice traffic is to be carried.

According to a further aspect of the invention, there is provided a method of transporting voice traffic between first and second media gateways over a virtual channel incorporated in a virtual trunk group in a broadband network, the method comprising performing a mutual exchange of session descriptors between said first and second gateways, wherein said session descriptors incorporate a virtual channel connection within the virtual trunk group for that voice traffic.

According to another aspect of the invention there is provided a method of transporting voice traffic between first and second end points over a virtual channel connection within an ATM trunk group via first and second media gateways each controlled by a respective first and second media gateway controller in a broadband network, the method comprising the steps of:

at the first gateway partially defining a session descriptor and sending the partly defined session descriptor via the first and second gateway controllers to the second gateway;

at the second gateway, receiving said partly defined session descriptor, determining a virtual channel connection, and sending to the first gateway via the second and first gateway controllers a fully defined session descriptor incorporating a virtual channel connection indicator for that virtual channel connection; and at the first gateway, receiving said fully defined session descriptor, and in response thereto establishing a connection to the second gateway on the selected virtual channel.

According to a further aspect of the invention, there is provided method of transporting voice traffic between first and second end points over a virtual channel connection within an ATM trunk group via first and second media gateways each controlled by a respective first and second media gateway controller in a broadband network, the method comprising:

at the first gateway controller, sending a create connection command to the first gateway;

at the first gateway, acknowledging the create connection command by sending to the second gateway controller a partly defined SDP session descriptor;

at the second gateway controller, sending a create connection command together with the partly defined session descriptor to the second gateway;

at the second gateway, determining a virtual channel connection, connecting the second end point to the virtual channel connection, and sending a fully defined session descriptor incorporating the identity of the virtual channel connection via the second gateway controller to the first gateway controller; and at the first gateway controller, sending the fully defined session descriptor incorporating the identity of the virtual channel connection to the first gateway so as to establish the virtual channel connection between the first and second gateways.

According to a further aspect of the invention, there is provided a communications data network arranged to carry both voice and data traffic, the network including means for identifying via a virtual channel connector indicator (VCCI) within a session descriptor a virtual channel connection within a bundle of virtual channel communications in an ATM trunk group on which identified virtual channel the voice traffic is to be carried.

According to a further aspect of the invention, there is provided a communications broadband network arranged to carry both voice and data traffic, the network comprising a connection fabric, a plurality of gateways each providing user access to the connection fabric and interconnected via ATM trunk groups each comprising a bundle of virtual channel connections, and gateway controllers each controlling at least one said gateway, and wherein each said gateway has means for exchanging session descriptors with another said gateway via one or more said controllers, and wherein each said session descriptor incorporates information for identifying via a virtual channel connection indicator (VCCI) within a said trunk group whereby to set up a voice connection over that identified virtual channel connection According to a further aspect of the invention, there is provided a media gateway for use in a broadband network arranged to carry both voice and data traffic, and having means for setting up a voice connection over a virtual channel connection within a bundle of virtual channel communications in an ATM trunk group, the gateway having means for selecting or creating a said virtual channel connection, and means for signalling to a similar gateway a session descriptor incorporating the identity of that virtual channel connection.

Preferably, the voice traffic is transported on ATM adaptation layer 2 (AAL2) wherein the traffic is transported in variable length minicells in ATM cells. However, the technique is in no way limited to AAL2.

In order that both the originating and terminating gateways may connect their respective TDM endpoints to the same CID in the same VCC for the same call, communication between the two gateways via the gateway controllers is provided. Each gateway needs to know the identity of its remote peer, together with a common view of the VCCI, the CID within the VCC and, where appropriate, the voice profile.

Advantageously, the gateway identifier is formatted as an NSAP (Network Service Access Point) address. This exchange of connection information is effected via the control protocol. The mechanism comprises the exchange of addressing information via session descriptors encoded using SDP. By comparison, in VoIP, the MGC(s) transparently transport the originating gateway's transport address and preferred encoding profiles to the terminating gateway, and then transport the terminating gateway's transport address and preferred encoding profiles back to the originating gateway.

A VCCI is used within a SDP session descriptor to identify uniquely a particular VCC within a bundle of VCCs forming an ATM trunk group. The exchange of session descriptors enables a terminating gateway to select or create a VCC and to signal its identity to the originating gateway. Advantageously, an AAL2 channel ID within the session descriptor may be used to identify uniquely a particular CID within a VCC.

In a further embodiment, each gateway may support a set of voice profiles. A common e.g. AAL2 voice profile may then be negotiated between two gateways. This is achieved by the originating gateway suggesting a set of voice profiles in the outgoing session descriptor and the terminating gateway choosing one such profile and incorporating that information in the returned session descriptor. Similarly, a common adaptation type and/or a common connecting fabric type can be negotiated between two gateways by means of an exchange of session descriptors.

In a further embodiment, a pair of gateways may be capable of supporting a number of connection fabric types, and the session descriptors may be used to negotiate selection of a particular fabric type for the session.

The semantics of the session descriptor may be adapted for use with AAL2, as follows. The originating gateway produces a session descriptor with its ATM address specified, but with the VCCI/CID left set to any ($). Similarly this gateway sets the voice profile to a list of the profiles that it supports, consistent with the voice codec as requested by the MGC. This is delivered (via the MGCs) to the terminating gateway which then may select an available VCCI/CID to the gateway identified in the received SDP, together with a single voice profile consistent with its capabilities, the codec requested by the MGC and the list of profiles offered by the originating gateway. The terminating gateway then returns the session descriptor (via the MGCs) with its own ATM address specified, and with the VCCI/CID and profile set.

In a preferred embodiment, the invention provides a method of leveraging Gateway SDP session descriptor exchange and media gateway controllers designed for VoIP which handle these SDP session descriptor exchanges, and use them to a) unambiguously exchange ATM VCC information such that a narrow-band call over ATM may be set-up.

b) supply relevant ATM addresses, whereby if necessary an ATM SVC connection may be established for the purpose of such a narrow-band call c) unambiguously exchange AAL2 connection identifier information such that a narrow-band call over AAL2ATMVCCs may be set-up.

d) allow negotiation of an unambiguous AAL2 voice profile to be used by both AAL2 gateways e) allow negotiation of the ATM adaptation layer (AAL1, 2 or 5) or the fabric itself (ATM, IP or other) to be used for this call.

BRIEF DESCRIPTION OF THE DRAWINGS

Preferred embodiments of the invention will now be described with reference to the accompanying drawings in which the single FIGURE is a schematic diagram of a broadband network arrangement according to a preferred embodiment of the invention.

DESCRIPTION OF PREFERRED EMBODIMENTS

Referring to the drawing, the network arrangement depicted in schematic form comprises an ATM transport network 10 providing connections between terminals or end points EP1, EP2 via respective originating and terminating media gateways 12a and 12b. The end points will typically comprise both voice and data terminal equipment provided either as separate entities or as an integrated voice and data terminal. The gateways 12a and 12b are controlled by respective media gateway controller 13a and 13b. Traffic, including voice traffic between pairs of end points is carried over an ATM trunk group 14 which is defined by the end device ATM addresses of the media gateways 12a, 12b respectively serving the end points 11a, 11b. Voice traffic between a gateway and an end point will normally be in a TDM format. Within the ATM trunk group, particular virtual channel connections (VCC) 15 are defined by respective virtual channel connection indicators (VCCI). It will also be appreciated that more than one ATM trunk group may be provided between a pair of gateways, and that the number of VCCs within a trunk group may either be fixed or adjustable. Control connectivity between the media gateway controller and each gateway it controls is via IP.

Although the drawing shows the gateways as each having a single connection to the network, it will be appreciated that, in general, each gateway will typically have a number of ports both to the network and to end points.

The architecture assumes that all gateways are fully meshed by interconnecting ATM e.g. AAL2 VCCs. All voice calls can be directly routed over a single VCC from an originating gateway, where conversion from TDM takes place, to the terminating gateway, where conversion back to TDM takes place There are two different methods of defining a VCC over a control interface. In order for a gateway to identify uniquely an ATM endpoint of a particular connection, the VCC needs to be uniquely identified. This identification can be direct or indirect.

Where the VCC is externally configured (e.g. PVCs) the control protocol can directly refer to the VCC in terms of local significance i.e. "physical interface+Virtual Path Identifier (VPI)+Virtual Circuit Identifier (VCI)".

Alternatively, where the VCC is locally established (SVCs signalled by the gateway through UNI or PNNI signalling), the VCC can be indirectly referred to in terms which are of significance to both ends of the VCC, i.e. the ATM address of the ATM device at each end of the VCC. However it is possible that there may be several VCCs for any given pair of ATM devices. Therefore the ATM address pair must be further resolved by a VCC identifier (VCCI) which is unambiguous within the context of the ATM address pair. Thus, the protocol can indirectly refer to the VCC in terms of "Remote GW ATM End System Address+ VCCI".

This indirect descriptor may be mapped internally by the gateway into one of local significance: "physical interface+ Virtual Path Identifier (VPI)+Virtual Circuit Identifier (VCI)"

It is the latter indirect approach that is preferred.

The following exemplary sequence, illustrated schematically in FIG. 2, describes the use of a mutual exchange SDP session descriptors to define a VCC:

a) The originating media gateway controller determines a list of routes as determined in a series of destination media gateway controller IDs.

b) The originating media gateway controller sends a CreateConnection command to the originating gateway (no remote endpoint defined—no SDP session descriptor data for end point EP2).

c) If end point EP1 (TDM) is available, the originating gateway acknowledges with a sparsely defined SDP session descriptor, i.e. the source (its) ATM address defined.

d) The originating media gateway controller relays the SDP session descriptor to the terminating media gateway controller together with an encapsulated ISUP message as required.

e) The terminating media gateway controller chooses a suitable gateway to reach the destination party (end point EP2) with available trunks, and sends a Create- Connection command with the sparse SDP session descriptor to the terminating gateway.

f) The terminating gateway either chooses a suitable pre-existing VCC or creates one, connects outgoing endpoint (EP2) to this VCC, and acknowledges with a fully defined SDP session descriptor (its ATM addresses and VCCI).

g) The terminating media gateway controller relays this SDP session descriptor to the originating media gateway controller. The originating media gateway controller modifies the connection on the originating gateway with the fully defined SDP session descriptor.

h) The originating gateway makes connection.

The network may employ permanent or semi-permanent virtual circuits (PVC, SPVC), or switched virtual circuits (SVC) may be set up on demand.

Advantageously, each Gateway maintains a status record on all used channels within any VCC. Where more than one VCC is available to a required destination, then the emptiest VCCs are chosen preferentially.

Where the network uses PVCs or SPVCs and the VCCI is provisioned, the ATM trunk group that links a pair of gateways can be assumed to contain a number of VCCs each with a unique VCCI known to both gateways.

Where the network assumes that SVCs may be created on demand, a mechanism is provided to a) choose VCCI unique to an end
b) pass that VCCI information to the far end
c) resolve any contention where both ends establish SVCs with the same VCCI within the same ATM trunk group.

It is assumed that each end manages its own VCCI pool for locally established SVCs within an ATM trunk group. It must of course ensure that no two concurrent VCCs share the same VCCI and that the same VCCI is not used for different consecutively established VCCs within a short time frame. This is necessary in order to avoid collision or "channel glare". The avoidance of channel glare will be discussed below. It should be noted that a SVC may attempt to re-establish itself due to network outage bearing an identical set of narrow-band calls using the same VCCI.

It is assumed that for UNI/PNNI signalled SVCs, the VCCI will be signalled end-to-end within the generic information transport (GIT) as part of the ITU Recommendation Q.2931 SETUP message. Ref. ITU Recommendation Q.2941.2.

The use of a VCCI should indicate as to whether this VCCI relates to an SVC that has been established locally or remotely. The aforementioned Q.2941.2 proposes that bit 16 of a 16 bit VCCI be used for that purpose. Thus each gateway may freely allocate 15 bit VCCIs without fear of contention.

In a preferred embodiment the a mutual exchange SDP session descriptors is employed to define a AAL2 CID and voice profile that is agreed by both media gateways.

In AAL2, multiple narrow-band calls may be mapped to a single VCC. These calls are differentiated within each VCC by a respective AAL2 channel identifier. An AAL2 connection may also span more than one VCC and transit AAL2 switching devices. For the cases of VCCs extending between media gateways, the AAL2 channel identifier (CID) is common to both gateways and may be used as a AAL2 connection identifier.

Advantageously, the SDP session descriptors are used to pass AAL2 CID information in the same SDP session descriptor exchange as described above. In addition to passing ATM address and VCCI, the terminating gateway chooses a free AAL2 CID and encapsulates this in the returning SDP session descriptor to the originating gateway. The information "Remote GW ATM End System Address+VCCI+CID" is sufficient to allow an end-to-end AAL2 connection to be established.

It is to be expected that both gateways may be required to select the AAL2 channels for different calls dependent on the direction from which these calls arrived. Therefore the possibility may arise that both gateways may attempt to select the same channel for two separate calls simultaneously. Unless means were taken to avoid this, channel 'glare' could occur by which both gateways choose the identical channel each independently believing that the channel was currently free. This potential conflict would only be resolved by the other end detecting the glare, and refusing the connection, thus causing the choosing end to choose again. This leads to additional messages and adds to post-dial delay. In our arrangement, the following mechanism prevents glare and thus avoids the need for such additional messaging.

Each end compares its own ATM address with the remote end's ATM address. The higher ranked address of the two assigns CID values from a list from the top down, the lower address from the bottom up. To prevent glare when these "meet in the middle", a number of mechanisms may be employed:

a) an absolute limit to the number of concurrent channels with CIDs selected from that end
b) an absolute limit to the number of concurrent channels in total.

This latter mechanism is preferred as it allows the VCC to be filled up to its design capacity thus maximising the bandwidth utilisation.

A pair of communicating AAL2 gateways must mutually agree a priori on a common voice profile for a given narrow-band call. ITU recommendation I.366.2 defines a number of voice profiles. However, both fixed proprietary and dynamically assigned voice profiles are possible.

In a further embodiment, the SDP session descriptors may be used to allow negotiation of the AAL2 voice profile to be used on a call. The originating gateway selects the set of voice profiles that it supports and which are compatible with the codec or coding bandwidth requested in the CreateConnection command. This set of voice profiles is passed as part of the outgoing SDP session descriptor to the terminating gateway. The terminating gateway may choose one of these profiles which is both compatible with the set of voice profiles that it supports and which is compatible with the codec or coding bandwidth requested in its CreateConnection command. This information is returned to the originating gateway as part of the returning SDP session descriptor.

The following are preferred formats for ATM Session descriptors for the standard ATM protocols.

AAL2 v=0 c=ATM<ATMaddress><VCCI> m = a u d i o
    AAL2<CID>I.366.2<voiceprofile#1>..<voiceprofile#2> where the ATM address takes form:

NSAP yyyy yyyy yyyy yyyy yyyy yyyy yyyy yyyy yyyy yyyy or

E164xxxxxxxxxxxxxxx or

GWIDzzzzzzzzzzzz where xxxx etc is the E.164 ATM address expressed as up to 15 digits;

where yyyy etc is the NSAP ATM address is expressed as 20 octets encoded as hexadecimal pairs;

where zzzz etc is a private voice gateway identifier (unique within context of network expressed as a ASCII string ("A"–"Z", "a"–"z", "0"–"9", ".","-","_");

where VCCI is expressed as 16 bit integer encoded as hexadecimal;

where CID is expressed as 8 bit integer encoded as hexadecimal; and where voice profile is expressed as decimal number in range 0-255-999 need to support wildcard "*" for <VCCI> & <CID>

AAL1 v=0 c=ATM<origATMaddress><VCCI> m=audio AAL1 <TS=*>00 where Timeslot (TS) can be 0 for single channel adaptation.

AAL5 v=0 c=ATM<origATMaddress><VCCI> m=audio AAL5 ORTP/AVT<avtcode#1>..<avtcode#n>

In a further embodiment, where gateways can support more than one underlying fabric, a mutual exchange of the SDP session descriptor can be used to negotiate the particular fabric to be used.

In the above description, where the SDP session descriptor is exchanged between two gateways, the form of the underlying fabric is assumed e.g. ATM, AAL1, ATM, AAL2, IP etc. If the gateway can only use one such form, then the choice of session descriptor type is not an issue, i.e. the gateway can and must offer only one type of SDP session descriptor. However an ATM connected gateway may well be capable of adapting to both AAL1 and AAL2, or a gateway may be both ATM connected and IP connected, and this information can thus be conveyed between gateways to provide further flexibility.

The originating media gateway controller may force a single SDP session descriptor type via a parameter in its CreateConnection command, but it, too, may have little knowledge of the capabilities and network connections on the other end of the network. In our arrangement, this is addressed by the originating gateway offering multiple session descriptors and the terminating gateway selecting a single session descriptor from the offered selection, a mechanism exists for selection of the adaptation type or indeed the fabric technology piggybacking on a simple message exchange. Anywhere on route to the terminating gateway, this session descriptor may be reduced by or on behalf of the terminating gateway.

For example, and originating gateway supporting IP, AAL1/ATM and AAL2/ATM may create a session descriptor as follows v=0 c=ATM<origATMaddress>* m = a u d i o

AAL2<CID>I.366.2<voiceprofile>..<voiceprofile> c=ATM<origATMaddress=*><ATMtrunk_ID=*> m = a u d i o < U D P p o r t > R T P /

AVT<voiceprofile>..<voiceprofile>

The terminating gateway may for example only support AAL2, so the response will be in form v=0 c=ATM<termATMaddress><VCCI=defined> m=audio AAL2<CID=defined>I.366.2<voiceprofile>

This ensures that the two gateways negotiate and mutually agree on AAL2 as the common protocol for the session.

It will be understood that the above description of a preferred embodiment is given by way of example only and that various modifications may be made by those skilled in the art without departing from the spirit and scope of the invention.

What is claimed is:

1. A method of transporting narrow band traffic between a first end point served by a first media gateway and a second end point served by a second media gateway within an ATM trunk group of a packet or cell based broadband network connecting said first and second gateways, each of said first and second gateways being controlled by a respective one of a first and a second media gateway controller, said method comprising the steps of:

at the first gateway, identifying a source ATM address associated with the first end point and sending a message containing said source ATM address via the first and second media gateway controllers to the second gateway;

at the second gateway, receiving said message containing said source ATM address, identifying a termination ATM address associated with the second end point, determining a virtual channel connection (VCC), and sending a message containing the termination ATM address and a virtual channel correction indicator (VCCI) for the determined VCC to the first media gateway via the second and first media gateway controllers; and at the first gateway, receiving said message from the second gateway and, in response thereto, establishing a connection to the second media gateway on said VCC.

2. A method as claimed in claim 1, wherein said message containing said source ATM address comprises a partially defined Session Descriptor Protocol (SDP) session descriptor.

3. A method as claimed in claim 2, wherein said message containing said termination ATM address and VCCI comprises a fully defined SDP session descriptor.

4. A method as claimed in claim 1, wherein said second media gateway determines a VCC by selecting a VCC from a set of permanent VCCs (PVCs).

5. A method as claimed in claim 1, wherein said second media gateway determines a VCC by selecting a VCC from a set of semi-permanent VCCs (SPVCs).

6. A method as claimed in claim 1, wherein said second media gateway determines a VCC by selecting a switched VCC (SVC).

7. A method as claimed in claim 6, wherein the selection of a SVC by said second media gateways comprises said gateway creating a new SVC.

8. A method as claimed in claim 3, wherein said second media gateway determines a VCC by selecting a switched VCC (SVC) and wherein said fully defined SDP session descriptor includes a VCC channel identifier (CID) to identify a narrow-band call mapped to said SVC.

9. A method as claimed in claim 8, wherein said fully defined SDP session descriptor includes a plurality of CIDs to differentiate a plurality of narrow-band calls mapped to said SVC.

10. A method as claimed in claim 9, wherein said CID identifies an AAL2 channel within the SVC.

11. A method as claimed in claim 9, wherein said source ATM address and said termination ATM address are given a rank with respect to assigning CID values such that the media gateway associated with the higher routed ATM address assigns CIDs from a list of available CIDs from the top down and the media gateway associated with the lower ranked ATM address assigns CIDs from the list from the bottom up, thus reducing the likelihood of said gateways assigning the same CID to different voice-band calls.

12. A method as claimed in claim 3, wherein said first and second gateways each support a set of ATM adaptation types, and wherein said partially defined and fully defined session descriptors incorporate messaging whereby one adaptation type is mutually agreed by said first and second gateways.

13. A communications network comprising:

a plurality of media gateways, each serving a number of narrow-band end points, said gateways being interconnected by ATM trunk groups, each comprising a bundle of virtual channel connections (VCCs);

a plurality of media gateway controllers, each controlling a respective media gateway;

wherein each gateway has means, responsive to receiving from another gateway via respective media gateway controllers a message containing a source ATM address associated with an end point served by said another gateway, to determine a virtual channel connection (VCC) and to send to said another gateway via said respective media gateway controllers a message containing a virtual channel connection indicator (VCCI) for said determined VCC together with a termination ATM address associated with an end point served by said gateway, whereby a connection between said another gateway and said gateway can be established on said VCC upon receipt by said another gateway of the message containing the VCCI and the termination ATM address.

14. A media gateway for a packet or cell based broadband communications network, said gateway serving a number of narrow-band communications network end points, said gateway having means to establish a connection to another gateway of the broadband network over an ATM trunk group connecting said gateways, said means for establishing a connection being arranged to receive from said another gateway via respective media gateway controllers a message containing a source ATM address associated with an end point served by said anther gateway and, in response thereto, to determine a virtual channel connection (VCC) and a termination ATM address associated with an end point served by said gateway and to send a message to said another gateway via said respective media gateway controllers, said message containing a virtual channel connection identifier (VCCI) for said VCC and said termination ATM address, whereby a connection between said another gateway and said gateway can be established on said VCC upon receipt by said another gateway of said message containing the VCCI and the termination ATM address.

* * * * *